United States Patent
Huelsmann

(10) Patent No.: US 12,515,621 B2
(45) Date of Patent: Jan. 6, 2026

(54) METHOD FOR MONITORING TRACTION FOR A MOTOR VEHICLE

(71) Applicant: Bayerische Motoren Werke Aktiengesellschaft, Munich (DE)

(72) Inventor: Florian Huelsmann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 92 days.

(21) Appl. No.: 18/266,163

(22) PCT Filed: Dec. 2, 2021

(86) PCT No.: PCT/EP2021/084012
§ 371 (c)(1),
(2) Date: Jun. 8, 2023

(87) PCT Pub. No.: WO2022/152461
PCT Pub. Date: Jul. 21, 2022

(65) Prior Publication Data
US 2024/0051505 A1  Feb. 15, 2024

(30) Foreign Application Priority Data
Jan. 18, 2021 (DE) ................ 10 2021 100 896.4

(51) Int. Cl.
*B60T 8/17* (2006.01)
*B60T 8/32* (2006.01)

(52) U.S. Cl.
CPC .......... *B60T 8/1706* (2013.01); *B60T 8/3205* (2013.01); *B60T 2240/06* (2013.01)

(58) Field of Classification Search
CPC .. B60T 8/1706; B60T 8/3205; B60T 2240/06; B60T 2270/20; B60T 2270/208
See application file for complete search history.

(56) References Cited

U.S. PATENT DOCUMENTS

| | | | |
|---|---|---|---|
| 5,241,478 A | 8/1993 | Inoue et al. |
| 5,868,474 A | 2/1999 | Abe et al. |
| (Continued) | | |

FOREIGN PATENT DOCUMENTS

| | | |
|---|---|---|
| CN | 102717786 A | 10/2012 |
| CN | 105751919 A | 7/2016 |
| (Continued) | | |

OTHER PUBLICATIONS

International Search Report (PCT/ISA/210) issued in PCT Application No. PCT/EP2021/084008 dated Mar. 18, 2022 with English translation (5 pages).

(Continued)

*Primary Examiner* — Joseph J Dallo
(74) *Attorney, Agent, or Firm* — Crowell & Moring LLP

(57) ABSTRACT

Methods, apparatuses, and systems for monitoring traction for a single-track motor vehicle are provided. A PID drive slip regulator regulates the drive slip of at least one driven wheel. An actual wheel slip and a target wheel slip are used as input variables of the PID drive slip regulator. The PID drive slip regulator ascertains a wheel drive torque from the sum of a P component, an I component, and a D component of the PID drive slip regulator and provides the wheel drive torque back to the at least one driven wheel. A transverse force potential, which constitutes the maximally transmissible transversal force of the at least one driven wheel onto a lane under current operating conditions, is determined using the I component of the PID drive slip regulator. The target wheel slip is determined using the transverse force potential.

8 Claims, 1 Drawing Sheet

(56) References Cited

U.S. PATENT DOCUMENTS

| | | | |
|---|---|---|---|
| 6,002,979 | A | 12/1999 | Ishizu |
| 6,182,003 | B1 | 1/2001 | Maier-Landgrebe |
| 6,240,355 | B1 | 5/2001 | Schmitt |
| 2004/0232764 | A1 | 11/2004 | Schafiyha et al. |
| 2010/0161188 | A1* | 6/2010 | Turski .................... B60T 8/175 701/67 |
| 2013/0231816 | A1* | 9/2013 | Hirata ................... B60W 10/08 903/946 |
| 2014/0257616 | A1 | 9/2014 | Wang et al. |
| 2017/0001644 | A1* | 1/2017 | Hartman ............... B60T 13/662 |
| 2021/0114457 | A1 | 4/2021 | Eberl et al. |

FOREIGN PATENT DOCUMENTS

| | | | | |
|---|---|---|---|---|
| CN | 107117073 | A | * | 9/2017 |
| CN | 108501944 | A | * | 9/2018 ............ B60W 30/02 |
| CN | 108715163 | A | * | 10/2018 ............ B60W 10/06 |
| CN | 108732923 | A | | 11/2018 |
| CN | 112218777 | A | | 1/2021 |
| DE | 42 05 068 | A1 | | 9/1992 |
| DE | 195 12 441 | A1 | | 10/1995 |
| DE | 198 49 666 | A1 | | 5/2000 |
| DE | 10 2013 213 117 | A1 | | 1/2015 |
| DE | 102021100896 | A1 | * | 7/2022 ............ B60T 8/1706 |
| EP | 0 829 401 | B1 | | 3/2002 |
| EP | 1 908 658 | A1 | | 4/2008 |
| JP | 5-52169 | A | | 3/1993 |
| WO | WO 03/013920 | A1 | | 2/2003 |
| WO | WO-2012071776 | A1 | * | 6/2012 .......... B60L 11/1803 |
| WO | WO-2015045759 | A1 | * | 4/2015 .............. B60L 15/20 |
| WO | WO-2022152460 | A1 | * | 7/2022 ............ B60K 28/16 |
| WO | WO-2022152461 | A1 | * | 7/2022 ............ B60T 8/1706 |

OTHER PUBLICATIONS

German-language Written Opinion (PCT/ISA/237) issued in PCT Application No. PCT/EP2021/084008 dated Mar. 18, 2022 (7 pages).

German-language Search Report issued in German Application No. 10 2021 100 894.8 dated Nov. 4, 2021 with partial English translation (12 pages).

International Search Report (PCT/ISA/210) issued in PCT Application No. PCT/EP2021/084012 dated Apr. 8, 2022 with English translation (5 pages).

German-language Written Opinion (PCT/ISA/237) issued in PCT Application No. PCT/EP2021/084012 dated Apr. 8, 2022 (7 pages).

German-language Search Report issued in German Application No. 10 2021 100 896.4 dated Nov. 12, 2021 with partial English translation (12 pages).

Ding, X. et al., "Hybrid Control-Based Acceleration Slip Regulation for Four-Wheel-Independent-Actuated Electric Vehicles", IEEE Transactions on Transportation Electrification, IEEE., vol. 7, No. 3, Dec. 31, 2020, pp. 1976-1989, XP011872772 (14 pages).

English translation of Chinese-language Office Action issued in Chinese Application No. 202180077612.9 dated Jun. 14, 2025 (9 pages).

* cited by examiner

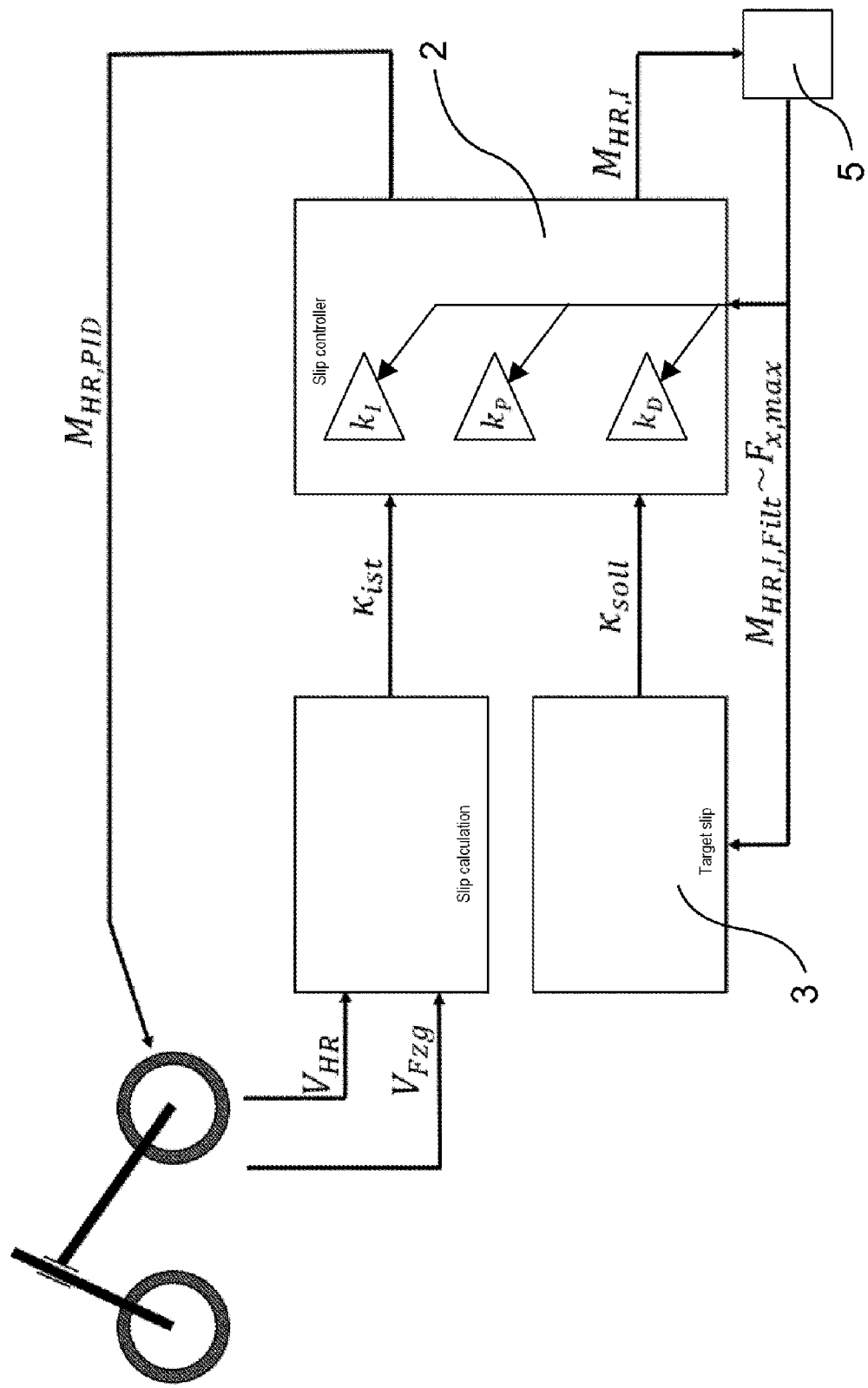

METHOD FOR MONITORING TRACTION FOR A MOTOR VEHICLE

BACKGROUND AND SUMMARY OF THE INVENTION

The present subject matter relates to a method for monitoring traction for a motor vehicle, in particular a single-track motor vehicle, having a PID drive slip controller for controlling a drive slip $_K$ of at least one driven wheel.

A traction control system describes a system which controls the drive torque of a motor vehicle in such a manner that maximum propulsion, or maximum traction, is generated while maintaining the stability of the vehicle. The control path of a traction control system is composed substantially of a motor, a drivetrain, and at least one driven wheel, or a tire of the at least one driven wheel, respectively. While the transmission behavior of the motor and the drivetrain can in each case considered to be constant, the transmission behavior of the tire is a function of many influencing variables and, as a result, highly variable. For the optimum parametrization of the traction control system all influencing variables of the tire and the effect thereof on the transmission behavior of the tire must be known. However, this is typically not possible with the traction control systems known from the prior art.

A PID controller (Proportional Integral Derivative Controller) is composed of the shares of a P component, an I component, and a D component, and can be defined from a parallel structure or a series structure. The P component here has proportional transmission behavior, and the P component is correspondingly composed exclusively of a proportional share of an amplification and by way of the output signal thereof is therefore proportion to the input signal. The I component has an integrative transmission behavior, and the I share by way of temporal integration of the input signal accordingly acts on the correcting variable. Furthermore, the D component has a differentiating transmission behavior and does not react to the level of the input signal but to the rate of change of the latter. Accordingly, the D component is a function of the rate of change of the input signal.

It is a customary approach to permit the driver of the motor vehicle of the traction control system to adapt to specific influencing variables of the tire, such as a coefficient of friction of the road, for example. To this end, the driver is offered for selection a number of different parameterizations of the traction control system, e.g. in the form of driving modes. Accordingly, the driver can choose the driving mode that appears to him to best match the prevailing conditions.

Additionally or alternatively, an attempt is made to measure or estimate as many of the influencing variables of the tire as possible and to adapt the traction control system according to the influencing variables ascertained. However, this requires high complexity in terms of development and is prone to errors by virtue of the multiplicity of influencing factors. Moreover, the customary components for measuring and estimating the influencing variables of the tire are very expensive, for example owing to special sensors, and/or very complex in terms of development, such as in terms of a coefficient of friction evaluator, for example.

It is therefore an object of the present subject matter to provide a method for monitoring traction for a motor vehicle, in particular a single-track motor vehicle, having a PID drive slip controller for controlling a drive slip $_K$ of at least one driven wheel, in which the control behavior is improved and the development complexity for supplying data to the PID drive slip controller is reduced.

This object is achieved by the combination of features as claimed in patent claim 1.

Proposed according to the present subject matter is a method for monitoring traction for a motor vehicle, in particular a single-track motor vehicle, having a PID drive slip controller for controlling a drive slip $_K$ of at least one driven wheel. An actual wheel slip $_{Kist}$ and a target wheel slip $_{Ksoll}$ are utilized as input variables of the PID drive slip controller. From a sum of a P component $M_{AR,P}$, an I component $M_{AR,I}$, and a D component $M_{AR,D}$, the PID drive slip controller ascertains a wheel drive torque $M_{AR,PID}$ and provides back the wheel drive torque $M_{AR,PID}$ to the at least one driven wheel. In the process, a longitudinal force potential $F_{x,max}$, which represents a maximum transmittable longitudinal force of the at least one driven wheel to a road surface under current operating conditions, is determined using the I component $M_{AR,I}$ of the PID drive slip controller (2), and the target wheel slip $_{Ksoll}$ is determined using the longitudinal force potential $F_{x,max}$.

Since the longitudinal force potential $F_{x,max}$ cannot be directly measured and is difficult to calculate, the evaluation of the longitudinal force potential $F_{x,max}$ is performed using the I component of the PID slip controller. If the target slip of the controller is optimal, the maximum longitudinal force of the tire is adjusted by the controller. The I component $M_{AR,I}$ of the PID controller here mirrors exactly the longitudinal force potential $F_{x,max}$ of the tire and can therefore be utilized for adapting the traction control system. It is advantageous here that a completely adaptive traction control system is configured, which dispenses with expensive sensor systems and complex evaluation algorithms and can thus be developed and sold inexpensively. The method according to the present subject matter for monitoring traction makes it possible for the developer to solve existing conflicting targets in the application of the traction control system that result from a limited number of driving modes and measured or evaluated variables. Moreover, the driver obtains further advantages such as, improved safety and performance, for example, and a more comfortable operation since the driver no longer has to perform the selection of different driving modes.

In one advantageous variant of example it is provided that the P component $M_{AR,P}$, the I component $M_{AR,I}$, and the D component $M_{AR,D}$ of the PID drive slip controller are in each case multiplied by a factor for the parametrization of the PID drive slip controller, wherein the respective factors for the parametrization of the PID drive slip controller are determined using the longitudinal force potential $F_{x,max}$. In this way, the optimal parametrization of the PID drive slip controller is adapted to the longitudinal force potential $F_{x,max}$, and thus to a road surface under current operating conditions.

In one preferred example of the present subject matter, the drive slip controller controls the drive slip $_K$ using adapting a motor torque, as a result of which the wheel drive torque $M_{AR,PID}$ is varied. As a result, the method for monitoring traction, or the PID drive slip controller, for controlling the drive slip $_K$ of at least one driven wheel intervenes in the motor control system and controls the corresponding slip.

In one example of the present subject matter it is provided that the actual wheel slip $_{Kist}$ is ascertained using a vehicle speed $v_{FZG}$ and a wheel circumferential speed vain.

The method according to the present subject matter in one variant of example ascertains the longitudinal force potential $F_{x,max}$ which represents a maximum transmittable longitudinal force of a tire of the at least one driven wheel under current operating conditions. The current operating conditions comprise at least an influence of a road surface, a temperature, a speed, a wheel load, a tire internal pressure and/or an intervening medium which is disposed between the tire and the road surface. It is advantageous here that the longitudinal force potential $F_{x,max}$ of the tire/tires of which the drive torque is controlled by the traction control system represents an overarching state variable of the tire, using which the traction control system can be adapted to all influencing variables of the tire/tires. The longitudinal force potential $F_{x,max}$ represents the maximum transmittable longitudinal force of the tire under the prevailing conditions. This state variable is determined by all influencing variables of the tire that influence the traction control system, and represents a representative summarization of all influencing variables of the tire. All relevant parameters of the traction control system can be adapted to the influencing variables of the tire using the longitudinal force potential $F_{x,max}$. This applies in particular to the wheel slip $_{Ksoll}$, and to the control parameters of the slip controller, in particular to the P, I and D factors of a PID slip controller.

Furthermore favorable is an example in which the I component $M_{AR,I}$ is low-pass filtered using a low-pass filter. Accordingly, the target slip controller determines a target wheel slip $_{Ksoll}$ as input variable of the PID drive slip controller using the longitudinal force potential $F_{x,max}$ which is ascertained using the low-pass filtered I component $M_{AR,I}$. Feedback effects can be avoided by a heavily low-pass filtered I component $M_{AR,I}$ before the latter is utilized as the longitudinal force potential $F_{x,max}$ for adapting the traction control system.

Further proposed according to the present subject matter is a PID drive slip controller for controlling a drive slip $_K$ of at least one driven wheel of a motor vehicle, in particular a single-track motor vehicle, preferably for carrying out the method according to one of the proceeding claims, comprising
   a. sensors for measuring a vehicle speed $v_{FZG}$ and a wheel circumferential speed $v_{AR}$; and
   b. a target slip controller for ascertaining a longitudinal force potential $F_{x,max}$ which represents a maximum transmittable longitudinal force of the wheel, in particular of a tire, under current operating conditions, and is able to be determined using the I component $M_{AR,I}$ of the PID drive slip controller;
Furthermore, a target wheel slip $_{Ksoll}$ as input variable of the PID drive slip controller is able to be determined by the target slip controller using the ascertained longitudinal force potential $F_{x,max}$.

It is advantageous here that the method for monitoring traction for a motor vehicle, in particular a single-track motor vehicle, using the corresponding PID drive slip controller is able to be applied for controlling a drive slip $_K$ of at least one driven wheel.

In one advantageous variant it is provided according to the present subject matter that the PID drive slip controller has a low-pass filter for low-pass filtering the I component $M_{AR,I}$. Accordingly, a target wheel slip $_{Ksoll}$ as input variable of the PID drive slip controller is able to be determined by the target slip controller using the longitudinal force potential $F_{x,max}$ which is determined using the low-pass filtered I component $M_{AR,I}$. It is favorable here that feedback effects are avoidable by a heavily low-pass filtered I component Maxi before the latter is utilized as the longitudinal force potential $F_{x,max}$ for adapting the traction control system.

The features disclosed above can be combined in an arbitrary manner to the extent that this is technically feasible and the features are not mutually contradictory.

Other advantageous refinements of the present subject matter are characterized in the dependent claims, or will be represented in more detail hereunder together with the description of the preferred example of the present subject matter by means of the FIGURES.

BRIEF DESCRIPTION OF THE DRAWING

FIG. 1 shows a block diagram of a PID drive slip controller for controlling a drive slip $_K$ of a driven wheel of a motor vehicle.

DETAILED DESCRIPTION

The FIGURE is schematic and an example. The same reference signs in the FIGURE denote functionally and/or structurally equivalent features.

Illustrated in FIG. 1 is a block diagram of a PID drive slip controller 2 for controlling a drive slip $_K$ of a driven wheel of a motor vehicle. The PID drive slip controller 2 for controlling the drive slip $_K$ of the driven wheel of a motor vehicle comprises sensors for measuring a vehicle speed $v_{FZG}$ and a wheel circumferential speed vain, and a target slip controller 3 for ascertaining a longitudinal force potential $F_{x,max}$ which represents a maximum transmittable longitudinal force of the wheel, in particular of a tire, under current operating conditions and is able to be determined using the I component $M_{AR,I}$ of the PID drive slip controller 2. Furthermore, a target wheel slip $_{Ksoll}$ as input variable of the PID drive slip controller 2 is able to be determined by the target slip controller 3 using the ascertained longitudinal force potential $F_{x,max}$.

Furthermore, the PID drive slip controller 2 has a low-pass filter 5 for low-pass filtering the I component $M_{AR,I}$. In the process, a target wheel slip $_{Ksoll}$ as input variable of the PID drive slip controller 2 is able to be determined by the target slip controller 3 using the longitudinal force potential $F_{x,max}$ which is able to be ascertained using the low-pass filtered I component $M_{AR,I}$.

Moreover, the PID drive slip controller 2 is configured to carry out the method described hereunder for monitoring traction for a motor vehicle for controlling a drive slip $_K$ of a driven wheel.

In the method, an actual wheel slip $_{Kist}$ and a target wheel slip $_{Ksoll}$ are utilized as input variables of the PID drive slip controller 2, and the PID drive slip controller 2 from a sum of a P component $M_{AR,P}$, an I component $M_{AR,I}$, and a D component $M_{AR,D}$ of the PID drive slip controller 2 ascertains a wheel drive torque $M_{AR,PID}$ which is fed back to the at least one driven wheel. In the process, the actual wheel slip $_{Kist}$ is ascertained using a vehicle speed $v_{FZG}$ and a wheel circumferential speed $v_{AR}$. Furthermore, a longitudinal force potential $F_{x,max}$, which represents a maximum transmittable longitudinal force of the at least one driven wheel to a road surface under current operating conditions, is determined using the I component $M_{AR,I}$ of the PID drive slip controller 2. Moreover, the target wheel slip $_{Ksoll}$ is ascertained using the longitudinal force potential $F_{x,max}$.

Furthermore, the longitudinal force potential $F_{x,max}$ represents a maximum transmittable longitudinal force of a tire of the at least one driven wheel under current operating conditions. The corresponding current operating conditions here comprise at least an influence of a road surface, a temperature, a speed, a wheel load, a tire internal pressure and/or an intervening medium which is disposed between the tire and the road surface.

The method furthermore comprises that the P component $M_{AR,P}$, the I component $M_{AR,I}$ and the D component $M_{AR,D}$ of the PID drive slip controller 2 are in each case multiplied by a factor for the parametrization of the PID drive slip controller 2. In the process, the respective factors for the parametrization of the PID drive slip controller 2 are determined using the longitudinal force potential $F_{x,max}$. Moreover, the PID drive slip controller 2 controls the drive slip $_K$ using adapting a motor torque, as a result of which the wheel drive torque $M_{AR,PID}$ is varied.

Moreover, the I component $M_{AR,I}$ is low-pass filtered using a low-pass filter (5). Accordingly, the target slip controller 3 determines a target wheel slip $_{Ksoll}$ as input variable of the PID drive slip controller 2 using the longitudinal force potential $F_{x,max}$ which is ascertained using the low-pass filtered I component $M_{AR,I}$.

The term module (and other similar terms such as unit, subunit, submodule, controller, etc.) in the present disclosure may refer to a software module, a hardware module, or a combination thereof. Modules implemented by software are stored in memory or non-transitory computer-readable medium. The software modules, which include computer instructions or computer code, stored in the memory or medium can run on a processor or circuitry (e.g., ASIC, PLA, DSP, FPGA, or other integrated circuit) capable of executing computer instructions or computer code. A hardware module may be implemented using one or more processors or electronic circuitry. A processor or electronic circuitry can be used to implement one or more hardware modules. Each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices and stored in memory or non-transitory computer readable medium.

The present subject matter in terms of the example thereof is not limited to the preferred examples set forth above. Rather, a number of variants which utilize the solution illustrated even in examples of a fundamentally different type are also conceivable.

The invention claimed is:

1. A method for monitoring traction for a single-track motor vehicle, having a PID drive slip controller for controlling a drive slip $_K$ of at least one driven wheel, comprising:
   inputting an actual wheel slip $K_{ist}$ and a target wheel slip $K_{soll}$ to the PID drive slip controller;
   ascertaining, by the PID drive slip controller, a wheel drive torque $M_{AR,PID}$ from a sum of a P component $M_{AR,P}$, an I component $M_{AR,I}$, and a D component $M_{AR,D}$;
   determining a longitudinal force potential $F_{x,max}$, which represents a maximum transmittable longitudinal force of the at least one driven wheel to a road surface under current operating conditions, using the I component $M_{AR,I}$ of the PID drive slip controller;
   determining the target wheel slip $K_{soll}$ using the longitudinal force potential $F_{x,max}$; and
   controlling a motor torque applied to the at least one driven wheel according to the wheel drive torque $M_{AR,PID}$.

2. The method as claimed in claim 1, further comprising:
   multiplying each of the P component $M_{AR,P}$, the I component $M_{AR,I}$, and the D component $M_{AR,D}$ of the PID drive slip controller by a factor for parametrization of the PID drive slip controller; and
   determining the respective factors for the parametrization of the PID drive slip controller using the longitudinal force potential $F_{x,max}$.

3. The method as claimed in claim 1, further comprising:
   controlling, using the PID drive slip controller, the drive slip $_K$ by adapting the motor torque, as a result of which the wheel drive torque $M_{AR,PID}$ is varied.

4. The method as claimed in claim 1, further comprising:
   ascertaining the actual wheel slip $K_{ist}$ using a vehicle speed $v_{FZG}$ and a wheel circumferential speed $v_{AR}$.

5. The method as claimed in claim 1, wherein
   the longitudinal force potential $F_{x,max}$ represents a maximum transmittable longitudinal force of a tire of the at least one driven wheel under current operating conditions, and
   the current operating conditions comprise at least an influence of a road surface, a temperature, a speed, a wheel load, a tire internal pressure and/or an intervening medium which is disposed between the tire and the road surface.

6. The method as claimed in claim 1, further comprising:
   low-pass filtering the I component $M_{AR,I}$ using a low-pass filter; and
   determining, using a target slip controller, a target wheel slip $K_{soll}$ as input variable of the PID drive slip controller using the longitudinal force potential $F_{x,max}$ that is ascertained using the low-pass filtered I component $M_{AR,I}$.

7. A PID drive slip controller for controlling a drive slip $_K$ of at least one driven wheel of a single-track motor vehicle, comprising:
   a vehicle speed sensor to measure a vehicle speed $v_{FZG}$;
   a circumferential speed sensor to measure a wheel circumferential speed $v_{AR}$; and
   a target slip controller to ascertain a longitudinal force potential $F_{x,max}$, which represents a maximum transmittable longitudinal force of a tire of the at least one driven wheel under current operating conditions, and is determined using an I component $M_{AR,I}$ of the PID drive slip controller, wherein
   a target wheel slip $K_{soll}$ input variable of the PID drive slip controller is determined by the target slip controller using the ascertained longitudinal force potential $F_{x,max}$, and
   wherein the PID drive slip controller determines a wheel drive torque $M_{AR,PID}$, and controls a motor torque applied to the at least one driven wheel according to the wheel drive torque $M_{AR,PID}$.

8. The PID drive slip controller as claimed in claim 7, further comprising:
   a low-pass filter to low-pass filter the I component $M_{AR,I}$, wherein
   a target wheel slip $K_{soll}$ as input variable of the PID drive slip controller is determined by the target slip controller using the longitudinal force potential $F_{x,max}$, which is ascertained using the low-pass filtered I component $M_{AR,I}$.

\* \* \* \* \*